(12) United States Patent
Huder et al.

(10) Patent No.: US 7,189,282 B2
(45) Date of Patent: Mar. 13, 2007

(54) METHOD FOR ELIMINATING MERCAPTAN FROM CRUDE GAS

(75) Inventors: Karin Huder, Frankfurt am Main (DE); Max-Michael Weiss, Oberursel (DE)

(73) Assignee: Lurgi AG, Frankfurt am Main (DE)

( * ) Notice: Subject to any disclaimer, the term of this patent is extended or adjusted under 35 U.S.C. 154(b) by 364 days.

(21) Appl. No.: 10/505,493

(22) PCT Filed: Jan. 22, 2003

(86) PCT No.: PCT/EP03/00582

§ 371 (c)(1), (2), (4) Date: Aug. 23, 2004

(87) PCT Pub. No.: WO03/072225

PCT Pub. Date: Sep. 4, 2003

(65) Prior Publication Data

US 2005/0103194 A1  May 19, 2005

(30) Foreign Application Priority Data

Feb. 26, 2002  (DE) ................ 102 08 253

(51) Int. Cl.
*B01D 47/00*  (2006.01)
*B01D 53/14*  (2006.01)
*B01D 53/50*  (2006.01)
*B01D 53/56*  (2006.01)
*C01B 47/06*  (2006.01)
*C01B 37/20*  (2006.01)
*C01B 17/20*  (2006.01)

(52) U.S. Cl. ........................ 95/235; 95/236; 95/295; 95/297; 95/223; 95/181; 95/199; 423/228; 423/229; 423/243.01; 423/242.07

(58) Field of Classification Search .......... 95/235, 95/236, 181, 199, 295, 297; 423/228, 229, 423/243.01, 243.07
See application file for complete search history.

(56) References Cited

U.S. PATENT DOCUMENTS

| 3,989,811 | A | * | 11/1976 | Hill ................ 423/576.8 |
| 4,372,925 | A | * | 2/1983 | Cornelisse ........... 423/226 |
| 4,552,572 | A |   | 11/1985 | Galstaun ............ 55/36 |
| 4,957,715 | A | * | 9/1990 | Grover et al. ....... 423/228 |
| 6,740,230 | B1 | * | 5/2004 | Hugo et al. ......... 208/237 |

FOREIGN PATENT DOCUMENTS

| WO | WO 97/26069 | 7/1997 |
| WO | WO 97/26070 | 7/1997 |

* cited by examiner

*Primary Examiner*—Duane Smith
*Assistant Examiner*—Ives Wu
(74) *Attorney, Agent, or Firm*—Norris McLaughlin & Marcus PA

(57) ABSTRACT

This invention relates to a process for cleaning gas, in particular hydrocarbonaceous gas such as e.g. natural gas, which is contaminated with sulfur in the form of $H_2S$ and mercaptans as well as $CO_2$.

To remove the undesired sulfur-containing substances in the form of $H_2S$ and mercaptan from crude gas, it is proposed in accordance with the invention that the crude gas is introduced into an absorption and regeneration column and washed therein, three gas streams being withdrawn from this absorption and regeneration column, a first exhaust gas stream being introduced into a Claus plant, a second sour gas stream with a low $H_2S$ concentration being introduced into another absorption plant, and a third gas stream, the valuable gas with the mercaptans, being cooled and supplied to an adsorption plant, that from this adsorption plant a cleaned valuable gas is withdrawn, and a mercaptan-containing gas stream is subjected to washing, that this concentrated mercaptan-containing gas is supplied to the Claus plant.

5 Claims, 1 Drawing Sheet

METHOD FOR ELIMINATING MERCAPTAN FROM CRUDE GAS

DESCRIPTION

This invention relates to a process of cleaning gas, in particular hydrocarbonaceous gas such as e.g. natural gas, which is contaminated with sulfur in the form of $H_2S$ and mercaptan as well as $CO_2$.

The document WO 97/26069 describes a process of cleaning carbon dioxide and sulfur-containing gases, in which there are sulfur-contaminated impurities in the form of mercaptans and $H_2S$. In a first absorption, the sulfur-contaminated impurities are removed from the gas, in order to produce a clean gas stream and a sour gas stream, the sour gas being hydrogenated in order to convert a major amount of mercaptans to $H_2S$. The hydrogenated sour gas is introduced into a second absorption/regeneration plant, in which the sour gas is separated into a first gas stream rich in $H_2S$, which is introduced into a Claus plant, and a second gas stream containing little $H_2S$, which is supplied to the post-combustion. The Claus plant is followed by a tail gas aftertreatment, in wich the $H_2S$ is reduced further and a gas rich in $H_2S$ is withdrawn.

What is disadvantageous in this process is the too small amount of sulfur and mercaptans which can be removed from the gas. In accordance with the prior art, it is only possible with a large effort to remove the sulfur from the crude gas for more than 95 wt-%.

It is the object underlying the invention to create an improved process for cleaning hydrocarbonaceous gas, in which the undesired sulfur-containing substances in the form of $H_2S$ and mercaptan are removed.

In accordance with the invention, this object is solved in that crude gas is introduced into an absorption and regeneration column and washed therein, three gas streams being withdrawn from this absorption and regeneration column, a first exhaust gas stream being introduced into a Claus plant, a second sour gas stream with a low $H_2S$ concentration of 10–30 vol-% being introduced into another absorption plant, and a third gas stream, the valuable gas with the mercaptans, being cooled and supplied to an adsorption plant, that from this adsorption plant a sweet gas is withdrawn and a gas stream containing mercaptan is subjected to washing. As washing stage, there is preferably used a physical washing stage, e.g. a Purisol plant, with which a small amount of gas with a high concentration of mercaptan is introduced into the Claus plant and part of the coadsorbed valuable gas from the regeneration of the adsorption plant is recovered as fuel gas. In the Claus plant, the mercaptan gas is burnt completely.

Due to the fact that before being introduced into the Claus plant, the second sour gas stream is first fortified in an absorption and the solution is regenerated in a fortification washing stage, the Claus plant can be designed smaller, as the sour gas stream has a higher concentration of $H_2S$. The processing of concentrated $H_2S$-containing gas and the mercaptan stream in the Claus plant as well as the processing of the gas stream from the first absorption and of the Claus exhaust gas in a tail gas washing stage increases the degree of sulfur recovery of the entire plant.

To achieve that the absorption plant for the sour gas to be fortified consumes less lye and only one regeneration column is required, the $H_2S$-containing solution is withdrawn from the absorption plant, which is disposed behind the hydrogenation of the residual Claus gas, and introduced into the absorption plant for fortifying the sour gas.

The degree of sulfur recovery is increased in that the gas from the absorption of the fortification is introduced into the hydrogenation, in order to convert sulfur components into $H_2S$, and subsequently into the absorption of the tail gas aftertreatment.

BRIEF DESCRIPTION OF THE DRAWINGS

The drawing depicts a block diagram of the process.

Embodiments of the process will be explained by way of example with reference to the drawing.

Figure 1:
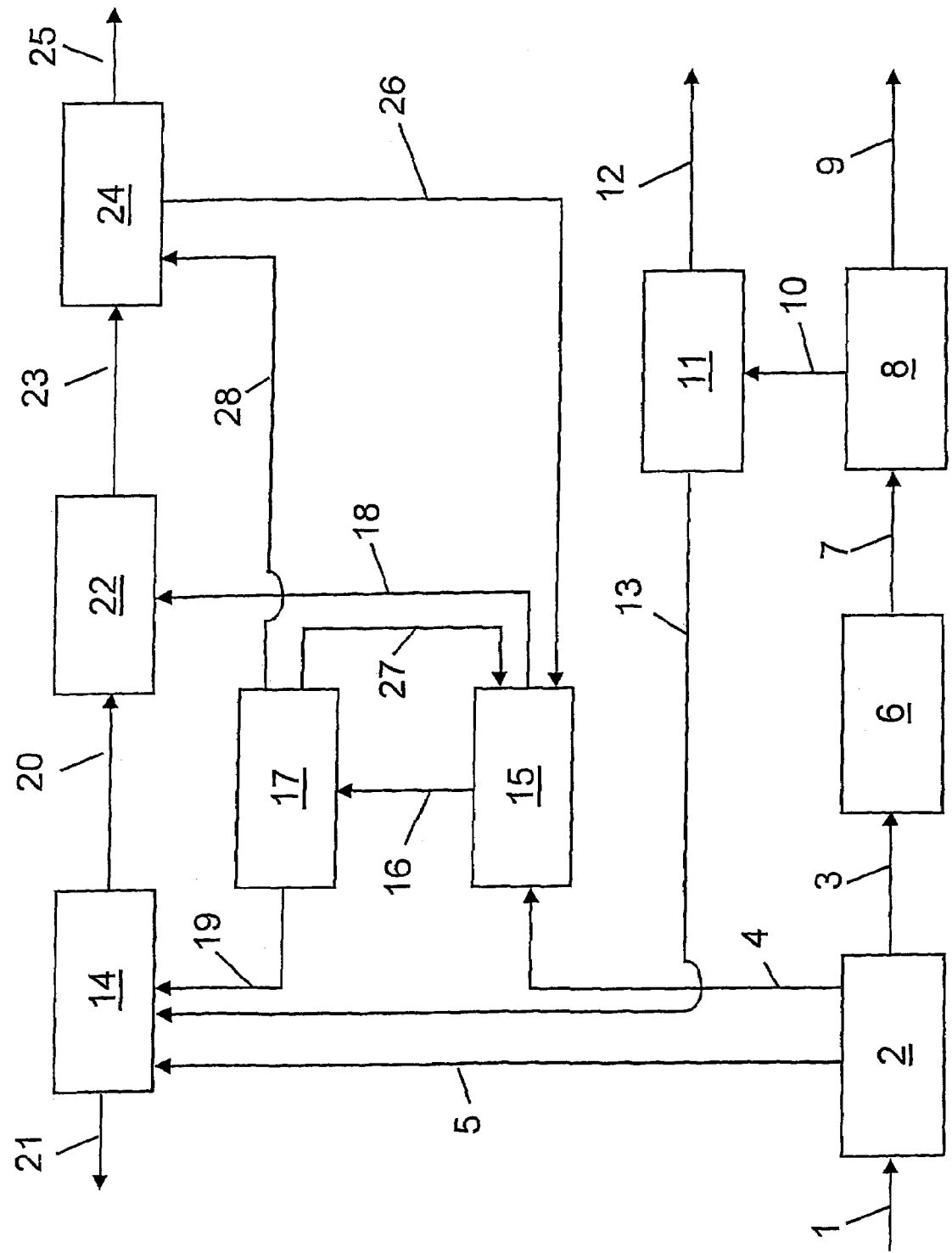

Through line (1), crude gas is introduced into a first washing stage comprising an absorption and regeneration column (2) and washed therein. A first exhaust gas stream (5) from the regeneration is directly introduced into a Claus plant (14). This exhaust gas stream (5) chiefly consists of up to 80 vol-% hydrocarbon and up to 20 vol-% $CO_2$ with small amounts of mercaptans (up to 0.3 vol-%) and $H_2S$ (up to 5 vol-%).

A second sour gas stream (4) with a low $H_2S$ concentration of up to 30 vol-% $H_2S$ is introduced into another absorption plant (15) and fortified there with a non-loaded solvent from lines (26) and (27). From the absorption plant (15), the solvent (16) loaded with $H_2S$ is introduced into a regeneration plant (17). The gas (up to 97 vol-% $CO_2$ and 0.2 vol-% mercaptan) from the absorption plant (15) is supplied to a hydrogenation (22) via line (18).

From the regeneration (17), sour gas with a high $H_2S$ concentration of up to 60 vol-% $H_2S$ is introduced into the Claus plant (14) via line (19).

From the absorption and regeneration column (2) a third gas stream (3), the valuable gas with the largest content of mercaptans, is withdrawn, cooled (6) and supplied to an adsorption (8) via line (7). From this adsorption (8), the valuable gas is supplied to further processes, e.g. a liquefaction, via line (9). The mercaptan-containing gas stream (10) is subjected to a physical washing stage, from which the coadsorbed valuable gas is recovered as fuel gas via line (12), and the highly concentrated mercaptan gas is supplied to the Claus plant (14) via line (13). The mercaptan stream is recovered in the regeneration of the Purisol solvent. The amount is small, but with a very high mercaptan concentration of 10 vol-% to 60 vol-%. As an alternative to the Purisol plant (11), another physical or physical-chemical washing stage is possible. However, the same have the disadvantage that too much $CH_4$ is absorbed. In the Claus plant (14), the mercaptan is burnt completely. The $SO_2$ obtained therefrom is reacted with the $H_2S$ from the sour gas of line (19) to form sulfur. The liquid sulfur obtained is withdrawn via line (21) and supplied to a further use. Thus, a high degree of sulfur recovery is achieved. The Claus plant (14) is a plant known per se, which consists of a combustion furnace as well as a plurality of catalytic reactors for performing the reaction. In the Claus plant (14), there is always obtained a so-called residual Claus gas, which apart from non-condensed elementary sulfur contains unreacted sulfur dioxide and $H_2S$. This residual gas is withdrawn via line (20) and subjected to an aftertreatment, in order to increase the degree of sulfur recovery. Via line (20), the residual Claus gas is supplied to a hydrogenation plant (22), which is also supplied with the gas from the absorption plant (15) via line (18). In the hydrogenation, $SO_2$ is converted to $H_2S$ and supplied to an absorption plant (24) via line (23). From the absorption plant (24), a solution is introduced into the fortification absorption (15) via line (26) for the further absorption of $H_2S$. The remaining $H_2S$-containing gas is withdrawn from the absorption plant (24) via line (25) and supplied to a combustion.

EXAMPLE

The following Table shows an analysis of the gas streams in the individual lines. The liquid process streams in lines (16), (26), (27) and (28) are not shown.

|  | Line No.: | | | | | | | | |
|---|---|---|---|---|---|---|---|---|---|
|  | 1 | | 3 | | 4 | | 5 | | 7 | |
|  | | | | | Process stream | | | | | |
|  | Crude Gas | | Valuable Gas | | Sour gas | | First Exhaust Gas Stream | | Cooled Valuable Gas | |
| Components | Nm³/h | Vol-% | Nm³/h | Vol-% | Nm³/h | Vol-% | Nm³/h | Vol-% | Nm³/h | Vol-% |
| $CO_2$ | 21680 | 2.59 | 41 | 0.005 | 21542.7 | 75.90 | 97.13 | 13.10 | 41 | 0.005 |
| $N_2$ | 29102 | 3.48 | 29092 | 3.59 | | | 9.88 | 1.33 | 29092 | 3.59 |
| $CH_4$ | 705460 | 84.26 | 704924 | 86.97 | 38.41 | 81.43 | 498.24 | 67.22 | 704924 | 87.06 |
| $C_2H_6$ | 45661 | 5.45 | 45610 | 5.63 | 5.49 | 5.27 | 45.08 | 6.08 | 45610 | 5.63 |
| $C_3H_8$ | 18593 | 2.22 | 18573 | 2.29 | 2.74 | 2.15 | 17.35 | 2.34 | 18573 | 2.29 |
| $i$-$C_4$ | 2981 | 0.36 | 2979 | 0.37 | | | 2.70 | 0.36 | 2979 | 0.37 |
| $n$-$C_4$ | 4333 | 0.52 | 4329 | 0.53 | | | 3.91 | 0.53 | 4329 | 0.53 |
| $i$-$C_5$ | 1203 | 0.14 | 1202 | 0.15 | | | 1.11 | 0.15 | 1202 | 0.15 |
| $n$-$C_5$ | 1040 | 0.12 | 1039 | 0.13 | | | 0.96 | 0.13 | 1039 | 0.13 |
| $C_6$ cut | 751 | 0.09 | 750 | 0.09 | | | 0.71 | 0.10 | 750 | 0.09 |
| $C_7$ cut | 379 | 0.05 | 379 | 0.05 | | | 0.28 | 0.04 | 379 | 0.05 |
| $C_8$ | 140 | 0.02 | 140 | 0.02 | | | 0.14 | 0.02 | 140 | 0.02 |
| $C_9$ | 93 | 0.01 | 93 | 0.01 | | | 0.07 | 0.01 | 93 | 0.01 |
| $H_2S$ | 5851 | 0.699 | 2 | 0 | 5816.5 | 20.49 | 31.74 | 4.28 | 2 | 0 |
| COS | 2.5 | 0.000 | 0.8 | 0 | 1.7 | 0.006 | 0.01 | 0.002 | 0.8 | 0 |
| $CH_3SH$ | 21.8 | 0.003 | 17.0 | 0.002 | 4.5 | 0.016 | 0.21 | 0.028 | 17.0 | 0.002 |
| $C_2H_5SH$ | 117.2 | 0.014 | 93.0 | 0.011 | 23.1 | 0.081 | 1.12 | 0.151 | 93.0 | 0.011 |
| $C_3H_7SH$ | 47.7 | 0.006 | 45.0 | 0.006 | 2.3 | 0.008 | 0.41 | 0.055 | 45.0 | 0.006 |
| $C_4H_9SH$ | 5.0 | 0.001 | 4.7 | 0.001 | 0.3 | 0.001 | 0.04 | 0.006 | 4.7 | 0.001 |
| $CS_2$ | | | | | | | | | | |
| $SO_2$ | | | | | | | | | | |
| SX | | | | | | | | | | |
| CO | | | | | | | | | | |
| $H_2$ | | | | | | | | | | |
| $O_2$ | | | | | | | | | | |
| $H_2O$ | | | 1182 | 0.15 | 946 | 3.33 | 30.16 | 4.07 | 383 | 0.05 |

|  | Line No.: | | | | | | | | |
|---|---|---|---|---|---|---|---|---|---|
|  | 9 | | 10 | | 12 | | 13 | | 18 | |
|  | | | | | Process Stream | | | | | |
|  | Sweet Gas | | Mercaptan-Containing Gas Stream | | Fuel Gas | | Enriched Mercaptan Gas | | Residual Absorption Gas | |
| Components | Nm³/h | Vol-% | Nm³/h | Vol-% | Nm³/h | Vol-% | Nm³/h | Vol-% | Nm³/h | Vol-% |
| $CO_2$ | 41 | 0.005 | | | | | | | 16588 | 96.11 |
| $N_2$ | 29077 | 3.60 | 7814.5 | 29.35 | 7812.2 | 29.65 | 2.3 | 0.82 | | |
| $CH_4$ | 704571 | 87.12 | 18552.5 | 69.68 | 18446.7 | 70.01 | 105.8 | 37.00 | 38 | 0.22 |
| $C_2H_6$ | 45587 | 5.64 | 22.8 | 0.09 | 22.3 | 0.08 | 0.5 | 0.17 | 5 | 0.03 |
| $C_3H_8$ | 18559 | 2.29 | 13.9 | 0.05 | 11.9 | 0.05 | 2.0 | 0.70 | 3 | 0.02 |
| $i$-$C_4$ | 2977 | 0.37 | 1.5 | 0.01 | 1.0 | 0 | 0.4 | 0.16 | | |
| $n$-$C_4$ | 4327 | 0.53 | 2.2 | 0.01 | 1.8 | 0.01 | 0.4 | 0.13 | | |
| $i$-$C_5$ | 1201 | 0.15 | 0.6 | 0 | 0.3 | 0 | 0.3 | 0.12 | | |
| $n$-$C_5$ | 1038 | 0.13 | 0.5 | 0 | 0.2 | 0 | 0.3 | 0.11 | | |
| $C_6$ cut | 749 | 0.09 | 1.3 | 0 | | | 1.3 | 0.45 | | |
| $C_7$ cut | 377 | 0.05 | 2.1 | 0.01 | | | 2.1 | 0.73 | | |
| $C_8$ | 138 | 0.02 | 1.7 | 0.01 | | | 1.7 | 0.61 | | |
| $C_9$ | 89 | 0.01 | 4.3 | 0.02 | | | 4.3 | 1.51 | | |
| $H_2S$ | 2.4 | 0.000 | | | | | | | 8.6 | 0.05 |
| COS | 0.8 | 0.000 | | | | | | | 1.5 | 0.009 |
| $CH_3SH$ | 0.2 | 0.000 | 16.8 | 0.063 | 0.2 | 0.001 | 16.6 | 5.80 | 4.1 | 0.024 |
| $C_2H_5SH$ | 1.4 | 0.000 | 91.6 | 0.344 | 0.3 | 0.001 | 91.3 | 31.95 | 20.7 | 0.120 |
| $C_3H_7SH$ | 0.7 | 0.000 | 44.3 | 0.167 | 0.9 | 0.003 | 43.4 | 15.20 | 2.1 | 0.012 |
| $C_4H_9SH$ | 0.1 | 0.000 | 4.6 | 0.017 | 0.7 | 0.003 | 4.0 | 1.39 | 0.2 | 0.001 |
| $CS_2$ | | | | | | | 10.0 | 0.03 | | |
| $SO_2$ | | | | | | | 74.0 | 0.20 | | |
| SX | | | | | | | 15.0 | 0.04 | | |
| CO | | | | | | | 852.0 | 2.30 | | |
| $H_2$ | | | | | | | 501.0 | 1.35 | | |
| $O_2$ | | | | | | | | | | |
| $H_2O$ | 0.8 | 0.000 | 51 | 0.19 | 51 | 0.19 | 9 | 3.16 | 588 | 3.41 |

-continued

| | Line No.: | | | | | | | | | |
|---|---|---|---|---|---|---|---|---|---|---|
| | 19 | | 20 | | 23 | | 25 | | 21 | |
| | | | | | Process stream | | | | | |
| | Concentrated $H_2S$-containing Gas | | Residual Claus Gas | | Hydrogenated Residual Claus Gas | | Exhaust Gas | | Liquid Sulfur | |
| Components | Nm³/h | Vol-% | Nm³/h | Vol-% | Nm³/h | Vol-% | Nm³/h | Vol-% | Nm³/h | Vol-% |
| $CO_2$ | 7550.4 | 53.02 | 7909 | 21.36 | 25955.6 | 42.66 | 23360 | 47.71 | | |
| $N_2$ | | | 17518 | 47.31 | 21717.3 | 35.69 | 21717 | 44.36 | | |
| $CH_4$ | | | | | 41.3 | 0.07 | 41 | 0.08 | | |
| $C_2H_6$ | | | | | 20.4 | 0.03 | 20 | 0.04 | | |
| $C_3H_8$ | | | | | 4.3 | 0.01 | 4 | 0.01 | | |
| i-$C_4$ | | | | | | | | | | |
| n-$C_4$ | | | | | | | | | | |
| i-$C_5$ | | | | | | | | | | |
| n-$C_5$ | | | | | | | | | | |
| $C_6$ cut | | | | | | | | | | |
| $C_7$ cut | | | | | | | | | | |
| $C_8$ | | | | | | | | | | |
| $C_9$ | | | | | | | | | | |
| $H_2S$ | 6238.5 | 43.80 | 148 | 0.40 | 455.2 | 0.75 | 24.48 | 0.05 | 0.09 | 0.00 |
| COS | 0.2 | 0.001 | 65 | 0.18 | 4.6 | 0.01 | 4.56 | 0.01 | | |
| $CH_3SH$ | 0.5 | 0.003 | | | 0.97 | 0.00 | 0.97 | 0.00 | | |
| $C_2H_5SH$ | 2.3 | 0.016 | | | 5.78 | 0.01 | 5.78 | 0.01 | | |
| $C_3H_7SH$ | 0.2 | 0.002 | | | 0.49 | 0.00 | 0.49 | 0.00 | | |
| $C_4H_9SH$ | 0.0 | 0.000 | | | | | | | | |
| $CS_2$ | | | 10 | 0.03 | | | | | | |
| $SO_2$ | | | 74 | 0.20 | | | | | | |
| SX | | | 15 | 0.04 | | | | | 8579.2 | 100.00 |
| CO | | | 852 | 2.30 | 149.73 | 0.25 | 149.73 | 0.31 | | |
| $H_2$ | | | 501 | 1.35 | 1380.53 | 2.27 | 1380.53 | 2.82 | | |
| $O_2$ | | | | | | | | | | |
| $H_2O$ | 450 | 3.16 | 9936 | 26.83 | 11103.9 | 18.25 | 2251 | 4.60 | | |

Corresponding to the values represented in the Table, crude gas is introduced into an absorption and regeneration column (2) via line (1) and washed therein. The first exhaust gas stream (5) from the regeneration, which consists of about 76 vol-% hydrocarbon and about 13 vol-% $CO_2$ with small amounts of mercaptans and $H_2S$, is directly introduced into a Claus plant (14).

A second sour gas stream (4) with a low $H_2S$ concentration (20.5 vol-%) is introduced into an absorption plant (15), where it is fortified with a non-loaded or hardly loaded solvent from lines (26) and (27). From the absorption plant (15), the solvent (16) loaded with $H_2S$ is introduced into a regeneration plant (17). The gas with about 96 vol-% $CO_2$ and 0.2 vol-% mercaptan from the absorption plant (15) is supplied to a hydrogenation (22) via line (18). From the regeneration (17), sour gas with a high $H_2S$ concentration (43.8 vol-%) is introduced into the Claus plant (14) via line (19).

From the absorption and regeneration column (2), a third gas stream (3) with a mercaptan content of about 0.01 vol-% is withdrawn, cooled (6) and supplied to an adsorption (8) via line (7). From this adsorption (8), the valuable gas is supplied to further processes, e.g. a liquefaction, via line (9). The mercaptan-containing gas stream is subjected to a physical washing stage, from which part of the valuable gas is recovered as fuel gas via line (12), and via line (13) the highly concentrated mercaptan gas is supplied to the Claus plant (14). The mercaptan stream is recovered in the regeneration of the Purisol solvent. The amount is small, but with a very high mercaptan concentration of about 54 vol-%. In the Claus plant (14), the mercaptan is burnt completely. The resulting $SO_2$ is reacted with the $H_2S$ from the sour gas of line (19) to obtain sulfur. The liquid sulfur obtained is withdrawn via line (21) and supplied to a further use. The residual gas of the Claus plant chiefly consists of the components $CO_2$, $N_2$ and $H_2O$ and is withdrawn via line (20).

The invention claimed is:

1. A process of removing mercaptan from crude gas, in which crude gas is introduced into an absorption and regeneration column (2) and washed therein, three gas streams (3, 4, 5) being withdrawn from this absorption and regeneration column (2), a first exhaust gas stream (5) being introduced into a Claus plant (14), a second gas stream (4) with a $H_2S$ concentration of up to 30 vol-% being introduced into another absorption plant (15), characterized in that a third gas stream (3), the valuable gas with the mercaptans, is cooled (6) and supplied to an adsorption plant (8), that from this adsorption plant (8) the cleaned valuable gas (9) is withdrawn, and a mercaptan-containing gas stream (10) is subjected to a washing stage (11), and that this concentrated mercaptan-containing gas (13) is supplied to the Claus plant (14).

2. The process as claimed in claim 1, characterized in that the washing stage (11) is a physical washing stage.

3. The process as claimed in claim 1, characterized in that the second gas stream (4) is fortified in an absorption plant (15), the resulting solution (16) is supplied to a regeneration (17), and the resulting gas (19) concentrated with $H_2S$ is supplied to the Claus plant (14).

4. The process as claimed in claim 1, characterized in that from the absorption plant (24), which is disposed behind the hydrogenation (22) of the residual Claus gas (20), the $H_2S$-containing solution (26) is withdrawn and introduced into the absorption plant (15) for the sour gas.

5. The process as claimed in claim 1, characterized in that the gas from the absorption of the fortification (15) is introduced into the hydrogenation (22) and then into the absorption plant (24).

* * * * *